(12) United States Patent
Kalhan

(10) Patent No.: US 8,619,706 B2
(45) Date of Patent: Dec. 31, 2013

(54) APPARATUS, SYSTEM AND METHOD FOR MANAGING WIRELESS SERVICE TO A WIRELESS COMMUNICATION DEVICE

(75) Inventor: Amit Kalhan, La Jolla, CA (US)

(73) Assignee: KYOCERA Corporation, Kyoto (JP)

( * ) Notice: Subject to any disclaimer, the term of this patent is extended or adjusted under 35 U.S.C. 154(b) by 1207 days.

(21) Appl. No.: 12/037,782

(22) Filed: Feb. 26, 2008

(65) Prior Publication Data

US 2008/0153497 A1    Jun. 26, 2008

Related U.S. Application Data

(63) Continuation-in-part of application No. 11/565,266, filed on Nov. 30, 2006.

(51) Int. Cl.
*H04W 36/00* (2009.01)
*H04W 4/00* (2009.01)

(52) U.S. Cl.
USPC .......................................... 370/331; 455/440

(58) Field of Classification Search
USPC ................. 370/331–334; 455/436–443, 445, 455/456.1, 456.2, 456.3, 456.4, 456.5
See application file for complete search history.

(56) References Cited

U.S. PATENT DOCUMENTS

| | | | |
|---|---|---|---|
| 4,737,978 A | 4/1988 | Burke et al. | |
| 5,208,756 A | 5/1993 | Song | |
| 5,293,645 A | 3/1994 | Sood | |
| 6,011,974 A | 1/2000 | Cedervall et al. | |
| 6,414,635 B1 | 7/2002 | Stewart et al. | |
| 6,434,367 B1 | 8/2002 | Kumar et al. | |
| 6,965,585 B2 | 11/2005 | Grill et al. | |
| 6,990,324 B2 | 1/2006 | Laroia et al. | |
| 7,019,663 B2 | 3/2006 | Sharony | |
| 7,050,819 B2 | 5/2006 | Schwengler et al. | |
| 7,167,712 B2 | 1/2007 | Ogino et al. | |
| 7,260,399 B1 * | 8/2007 | Oh et al. | 455/436 |
| 7,286,834 B2 | 10/2007 | Walter | |

(Continued)

FOREIGN PATENT DOCUMENTS

| | | |
|---|---|---|
| EP | 0 504 122 | 9/1992 |
| EP | 1587221 A2 | 10/2005 |

(Continued)

OTHER PUBLICATIONS

Han, et al. "A Method to Support Femto-Macro Handover with Minimal Interference to the Macro Network" IP.com Journal Oct. 16, 2008, pp. 1-4, West Henrietta, NY US.

(Continued)

*Primary Examiner* — Habte Mered

(57) ABSTRACT

A detecting base station detects a wireless communication device by intercepting an uplink communication signal intended for an originating base station. In response to the detection of the wireless communication device, the detecting base station sends a message to the core network. The detecting base station includes a mobile communication device detector configured to intercept the uplink communication signal transmitted from the wireless communication device to the originating base station of a communication network. A network interface within the detecting base station is configured to send a device proximity message to the communication network where the device proximity message is based on the proximity of the wireless communication device to the detecting base station. The device proximity message may be a handoff request, distance, or other information that is derived or otherwise related to the intercepted uplink communication signal.

13 Claims, 8 Drawing Sheets

(56) References Cited

U.S. PATENT DOCUMENTS

| | | |
|---|---|---|
| 7,339,909 B2 * | 3/2008 | Kotzin .................... 370/331 |
| 7,433,673 B1 | 10/2008 | Everson et al. |
| 7,539,173 B2 | 5/2009 | Ishiguro et al. |
| 7,539,499 B2 * | 5/2009 | Holur et al. ............ 455/452.2 |
| 7,610,049 B2 | 10/2009 | Watanabe |
| 2003/0118015 A1 | 6/2003 | Gunnarsson et al. |
| 2004/0051664 A1 | 3/2004 | Frank |
| 2004/0090937 A1 | 5/2004 | Chaskar et al. |
| 2004/0116133 A1 | 6/2004 | Kalhan et al. |
| 2004/0198220 A1 | 10/2004 | Whelan et al. |
| 2005/0059400 A1 | 3/2005 | Jagadeesan et al. |
| 2005/0090277 A1 | 4/2005 | Islam et al. |
| 2005/0135459 A1 | 6/2005 | Ginzburg et al. |
| 2005/0197132 A1 | 9/2005 | Lee et al. |
| 2005/0232189 A1 | 10/2005 | Loushine |
| 2005/0237963 A1 | 10/2005 | Storm |
| 2005/0282494 A1 | 12/2005 | Kossi et al. |
| 2006/0025138 A1 * | 2/2006 | Kotzin .................... 455/445 |
| 2006/0040656 A1 | 2/2006 | Kotzin |
| 2006/0056448 A1 | 3/2006 | Zaki et al. |
| 2006/0073840 A1 | 4/2006 | Akgun et al. |
| 2006/0114885 A1 | 6/2006 | Baek et al. |
| 2006/0121916 A1 | 6/2006 | Aborn et al. |
| 2006/0203743 A1 | 9/2006 | Quinn et al. |
| 2006/0264212 A1 | 11/2006 | Sekhar |
| 2006/0268902 A1 | 11/2006 | Bonner |
| 2007/0002813 A1 | 1/2007 | Tenny et al. |
| 2007/0008925 A1 | 1/2007 | Dravida et al. |
| 2007/0010261 A1 | 1/2007 | Dravida et al. |
| 2007/0021127 A1 | 1/2007 | Zheng |
| 2007/0049276 A1 | 3/2007 | Rimoni et al. |
| 2007/0058598 A1 | 3/2007 | Ling |
| 2007/0076662 A1 | 4/2007 | Jain et al. |
| 2007/0104139 A1 | 5/2007 | Marinier et al. |
| 2007/0121560 A1 * | 5/2007 | Edge .................... 370/338 |
| 2007/0140190 A1 | 6/2007 | Rensburg et al. |
| 2007/0149211 A1 | 6/2007 | Dunn et al. |
| 2007/0177530 A1 | 8/2007 | Ando et al. |
| 2007/0184845 A1 | 8/2007 | Troncoso |
| 2007/0201403 A1 | 8/2007 | Thome |
| 2007/0243882 A1 | 10/2007 | Edge |
| 2007/0254620 A1 | 11/2007 | Lindqvist et al. |
| 2008/0076420 A1 | 3/2008 | Khetawat et al. |
| 2008/0130555 A1 * | 6/2008 | Kalhan .................... 370/329 |
| 2008/0130596 A1 * | 6/2008 | Kalhan .................... 370/338 |
| 2008/0130597 A1 * | 6/2008 | Kalhan .................... 370/338 |
| 2008/0130598 A1 | 6/2008 | Kalhan |
| 2008/0132239 A1 | 6/2008 | Khetawat et al. |
| 2008/0153497 A1 | 6/2008 | Kalhan |
| 2008/0261615 A1 | 10/2008 | Kalhan |
| 2008/0311927 A1 | 12/2008 | Boman et al. |
| 2009/0129341 A1 * | 5/2009 | Balasubramanian et al. 370/331 |
| 2009/0163216 A1 * | 6/2009 | Hoang et al. .................. 455/450 |
| 2009/0213819 A1 | 8/2009 | Kalhan et al. |
| 2009/0215400 A1 | 8/2009 | Chang et al. |
| 2010/0093351 A1 * | 4/2010 | Barrett et al. .................. 455/436 |

FOREIGN PATENT DOCUMENTS

| | | | | |
|---|---|---|---|---|
| EP | 1816888 | | 8/2007 | |
| EP | 1986341 | | 10/2008 | |
| JP | 07-154848 | | 6/1995 | |
| JP | 2002-353876 | | 6/2002 | |
| JP | 2005-110314 | | 4/2005 | |
| JP | 2005-269109 | | 9/2005 | |
| SE | EP0504122 | * | 9/1992 | ............ H04Q 7/04 |
| WO | WO 98/19474 | | 5/1998 | |
| WO | WO 02/054820 | | 7/2002 | |
| WO | WO 2004-002051 | | 12/2003 | |
| WO | WO 2004-054153 | | 6/2004 | |
| WO | WO 2004-054153 | | 6/2004 | |
| WO | WO 2004/057815 | | 7/2004 | |
| WO | WO 2004/084463 | | 9/2004 | |
| WO | WO 2005-076639 | | 8/2005 | |
| WO | WO 2005/076639 | | 8/2005 | |
| WO | WO 2007/064822 | | 6/2007 | |
| WO | WO 2008/066926 | | 6/2008 | |
| WO | WO 2008/066927 | | 6/2008 | |
| WO | WO 2008/066928 | | 6/2008 | |
| WO | WO 2008/066929 | | 6/2008 | |
| WO | WO 2008/091412 | | 7/2008 | |
| WO | WO 2009/067700 | | 5/2009 | |

OTHER PUBLICATIONS

Carstens, Juergen, "A Method for Interference Control and Power Saving for Home Access Point", IP.Com Journal, Dec. 13, 2007, pp. 1-3, West Henrietta, NY US.

Alejandro R. Holman and Edward G. Tiedemann Jr., "CDMA Intersystem Operations", 1994 IEEE 44th Vehicular Technology Conference, Jun. 8, 1994. pp. 590-594, Stockholm Sweden.

Baseband Processors Lower Bom in FEMTOCELL Apps; Jun. 25, 2008; http://www.eetasia.com/articleLogin.do?artId=8800531130&fromWhere=/ART_8800531130_499495_NP_daceb3a3.HTM&catId=4.

FEMTOCELL Thoughts, Sep. 2007; http://mobilesociety.typepad.com/mobile_life/2007/09/femtocell-tho-1.html*.

* cited by examiner

APPARATUS, SYSTEM AND METHOD FOR MANAGING WIRELESS SERVICE TO A WIRELESS COMMUNICATION DEVICE

RELATED APPLICATIONS

This application is a continuation-in-part (CIP) of U.S. patent application Ser. No. 11/565,266, filed on Nov. 30, 2006, entitled APPARATUS, SYSTEM AND METHOD FOR MANAGING WIRELESS LOCAL AREA NETWORK SERVICE TO A MULTI-MODE PORTABLE COMMUNICATION DEVICE. This application is also related to U.S. patent application Ser. No. 12/407,707, filed on Mar. 19, 2009, entitled "PILOT SIGNAL TRANSMISSION management," and to U.S. patent application Ser. No. 12/037,754, filed on Feb. 26, 2008, entitled "APPARATUS, SYSTEM AND METHOD FOR INITIATING WLAN SERVICE USING BEACON SIGNALS," both applications incorporated by reference in their entirety, herein. This application is also related to: U.S. patent application Ser. No. 11/565,419, filed on Nov. 30, 2006, entitled "MANAGEMENT OF WLAN AND WWAN COMMUNICATION SERVICES TO A MULTI-MODE WIRELESS COMMUNICATION DEVICE," U.S. patent application Ser. No. 11/565,323, filed on Nov. 30, 2006, entitled "DETECTION OF A MULTI-MODE PORTABLE COMMUNICATION DEVICE AT A MESH NETWORK," and U.S. patent application Ser. No. 11/565,383, filed on Nov. 30, 2006, entitled "APPARATUS, SYSTEM AND METHOD FOR MANAGING WIRELESS LOCAL AREA NETWORK SERVICE BASED ON A LOCATION OF A MULTI-MODE PORTABLE COMMUNICATION DEVICE," all incorporated by reference in their entirety, herein.

TECHNICAL FIELD

The invention relates in general to wireless communication systems and more specifically to managing wireless communication services to portable communication devices.

BACKGROUND

Wireless communication networks provide wireless communication services to mobile wireless communication devices through a plurality of base stations that have geographical service coverage areas often referred to as cells. A base station may have any of numerous sized and shaped cells where a terminology has developed to categorize the various cell sizes. Cells can be categorized as macrocells, microcells, picocells, and femtocells. Macrocells are typically deployed with wireless wide area networks (WWAN) and have sizes measured in miles. Microcells are typically implemented to cover a block. Picocells are generally considered to be smaller than microcells and may be implemented to cover a small number of suites or a portion of a building. Femtocells are the smallest of the four categories and are typically implemented as extensions to other networks to provide service to a single residence or other similar small area.

In some implementations, networks using different communication technologies may provide service within overlapping geographical service areas. Wireless local area networks (WLANs) and wireless wide area networks (WWANs) provide wireless communication services to portable devices where the WLANs typically provide services within geographical service areas that are smaller than the geographical areas serviced by WWANs. Examples of WWANs include systems that operate in accordance with 2.5G (such as cdma2000), 3G (such as UMTS, WiMax), and other types of technologies, where each base station of the WWAN is typically designed to cover a service area having a size measured in miles. The term WWAN is used primarily to distinguish this group of diverse technologies from WLANs that typically have smaller service areas on the order of 100 to 300 feet per base station. Base stations in WLANs are typically referred to as access points. An access point may be connected to the Internet, intranet, or other network through wires or wirelessly through a WWAN. Examples of WLANs include systems using technologies such as Wi-Fi and other wireless protocols in accordance with IEEE 802.11 standards. WLANs typically provide higher bandwidth services than WWANs at the expense of non-ubiquitous coverage whereas WWANs provide increased coverage areas at the cost of bandwidth and/or capacity. In order to provide a wireless user with the increased overall performance and continuous connectivity, multi-mode mode and dual-mode portable communication devices have been developed allowing the communication device to access the particular type of network that provides the most desirable tradeoffs. A multi-mode wireless communication device includes the appropriate components and functionality for communicating within more than one network. For example, a dual-mode portable communication device can communicate within a WWAN and a WLAN.

In order to provide a wireless user with the increased overall performance and continuous connectivity, many wireless communication devices can access more than one type of network. The device may access a particular type of network that provides the most desirable features and/or performance. Multimode wireless communication devices that can access two or more networks operating with different technologies. For example, a dual-mode portable communication device can communicate within a WWAN and a WLAN.

Unfortunately, conventional techniques for managing the connection status between the portable communication device and the access point are limited in that they require GPS location information or include inefficient searching mechanisms executed by the portable communication device in order to establish service with a new network for performing a handoff between networks. For example, some conventional systems require the mobile communication device to periodically tune to an alternate network channel in an attempt to detect an alternate network or alternate size cell resulting in significant power consumption with a limited success rate of detecting alternate networks or base stations.

Locating a wireless communication device using conventional techniques in femtocell implementations may be more difficult. The femtocell base station is a scalable, multi-channel, two-way communication device similar to a typical base station within the particular communication system. The femtocell base station, however, is typically implemented within a residence, business, or other relatively small area as compared to the macrocell and is connected to the core network through a packet switched network such as intranet or the Internet. One example of a femtocell base station is a UMTS access point base station containing a Node-B, RNC and GSN, with an Ethernet or broadband connection to the Internet or an intranet. In some situations the femtocell base station may be connected to the packet switched network through ATM/TDM connection. Application of VoIP allows such a unit to provide voice and data services in the same way as a normal base station, but with the deployment simplicity of a Wi-Fi access point. Other examples include CDMA-2000 and WiMAX base stations. The femtocell base stations (FBS) and the wireless communication devices operate in accordance with the existing radio access network (RAN) technologies. In a typical deployment, a femtocell service area is very small relative to a macrocell coverage making it extremely difficult for the wireless communication device to search for the femtocell signal. Further, the problem is acerbated when the device is required to tune from the macrocell frequency to a femtocell frequency for the search. As a result, quality of service (QoS) is degraded and power consumption increases.

Accordingly, there is a need for an apparatus, system, and method for managing communication service to a wireless communication device.

SUMMARY

A detecting base station detects a wireless communication device by intercepting an uplink communication signal intended for an originating base station. In response to the detection of the wireless communication device, the detecting base station sends a message to the core network. The detecting base station includes a mobile communication device detector configured to intercept the uplink communication signal transmitted from the wireless communication device to the originating base station of a communication network. A network interface within the detecting base station is configured to send a device proximity message to the communication network where the device proximity message is based on the proximity of the wireless communication device to the detecting base station. The device proximity message may be a handoff request, distance, or other information that is derived or otherwise related to the intercepted uplink communication signal.

DETAILED DESCRIPTION

Figure 1A:
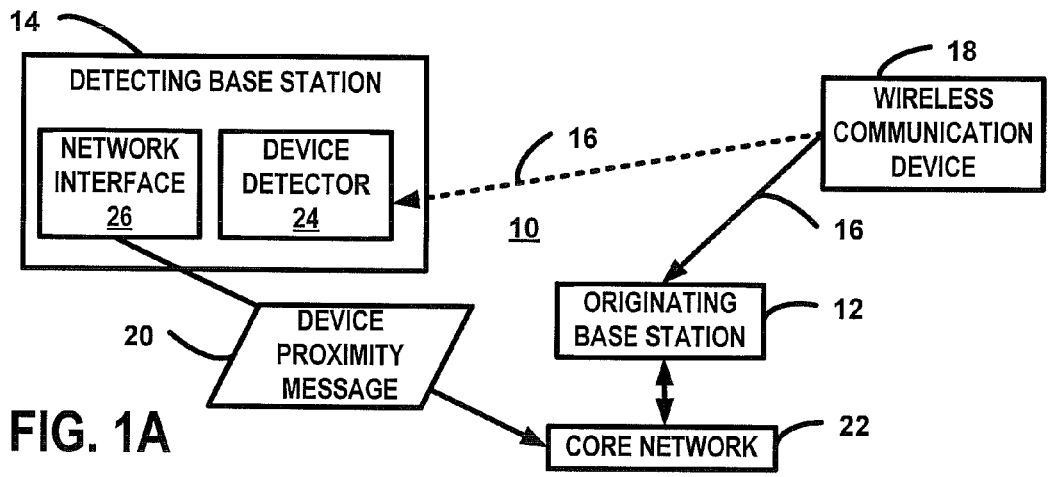
FIG. 1A is a block diagram of a communication system with an originating base station and a detecting base station.

FIG. 1A is a block diagram of a communication system 10 with an originating base station 12 and a detecting base station 14. The communication system 10 may have any of numerous types of wireless communication systems or arrangements of communication systems, networks and infrastructure that operate using any of numerous protocols and standards. Examples of some suitable communication technologies include systems that operate in accordance with Universal Mobile Telecommunications System (UMTS), Code Division Multiple Access (CDMA2000), WiMax and WiFi techniques. The various components illustrated in FIG. 1A may be referred to by different terms depending on the particular standard or technology. The originating base station 12 and/or the detecting base station 14 may be referred to as a base station, macro base station, macrocell base station, access point, Node-B, cellular base station and other terms. The wireless communication device 18 may be referred to as a handset, mobile device, access terminal (AT), cell phone, portable device and by other terms. Where the wireless communication device 18 is capable of communicating on more than one type of network, it may be referred to as dual-mode wireless communication device, tri-mode wireless communication device, multimode wireless device, or other similar names. The core network 22 includes any combination of equipment and infrastructure for communicating with, controlling, and managing the base stations 12, 14. The core network 22 may be a single network or multiple interconnected networks and be implemented within a larger communication network (not shown in FIG. 1A). For example, the core network may be a single cellular communication network or may include a cellular network interconnected with infrastructure of one or more wireless local area networks (WLANs).

The detecting base station 14 intercepts a communication signal 16 transmitted by a wireless communication device 18 to the originating base station 12. In response to the detection, the detecting base station 14 sends a device proximity message 20 to a core network 22 indicating that the wireless communication device 18 is at least possibly within a service area of the detecting base station 14. As described below in further detail, the device proximity message 20 may provide any of numerous types of indicators or information based on, determined from, or estimated from the received (intercepted) uplink communication signal 16.

The detecting base station 14 includes a mobile communication device detector 24 configured to intercept the communication signal and a network interface 26 configured to send the device proximity message 20 to the core network 22. The device proximity message 20 is based on the proximity of the wireless communication device 18 to the detecting base station 14. Depending on the particular implementation, the device proximity message 20 may be a request to the core network 22 to handoff the wireless communication device 18 to the detecting base station 14, may indicate the distance between the wireless communication device 18 and the detecting base station 14, or may indicate the possibility that the wireless communication device 18 may be within range of the detecting base station 14 to receive wireless service. Examples of information that may be conveyed in the device proximity message 20 include a power level, a signal to noise ratio (SNR), a bit error rate (BER), and/or transmission delay of the uplink communication signal. Therefore, the device proximity message 20 does not necessarily include data that directly indicates proximity of the wireless communication device 18 to the detecting base station 14.

The core network 22 may assign and designate communication channels to each of the base stations 12, 14 for communication with wireless communication devices 18. The channel allocation and division may be based on any combination of frequencies, spreading codes, time slots, and or other resource divisions. The communication signal 16 transmitted by the wireless communication device to the originating base station is transmitted using the channel assigned to the originating base station 12 for uplink (sometimes referred to as reverse link) communication. The network interface 22 in the detecting base station 14, therefore, is configured to receive, or at least detect, signals transmitted in accordance with the uplink channel assigned to the originating base station 12. The uplink channel assigned to the originating base station 12 is not assigned to the detecting base station for providing wireless communication service to the wireless communication device 18.

The assignment of communication channels is often based either directly or indirectly on a unique identification value of the wireless communication device 18 such an electronic serial number (ESN). In the implementations discussed below, the detecting base station 14 monitors uplink (reverse link) channels assigned to the particular wireless communication devices 18 that are authorized to use the detecting base station 14 based on the identification values.

Figure 1B:
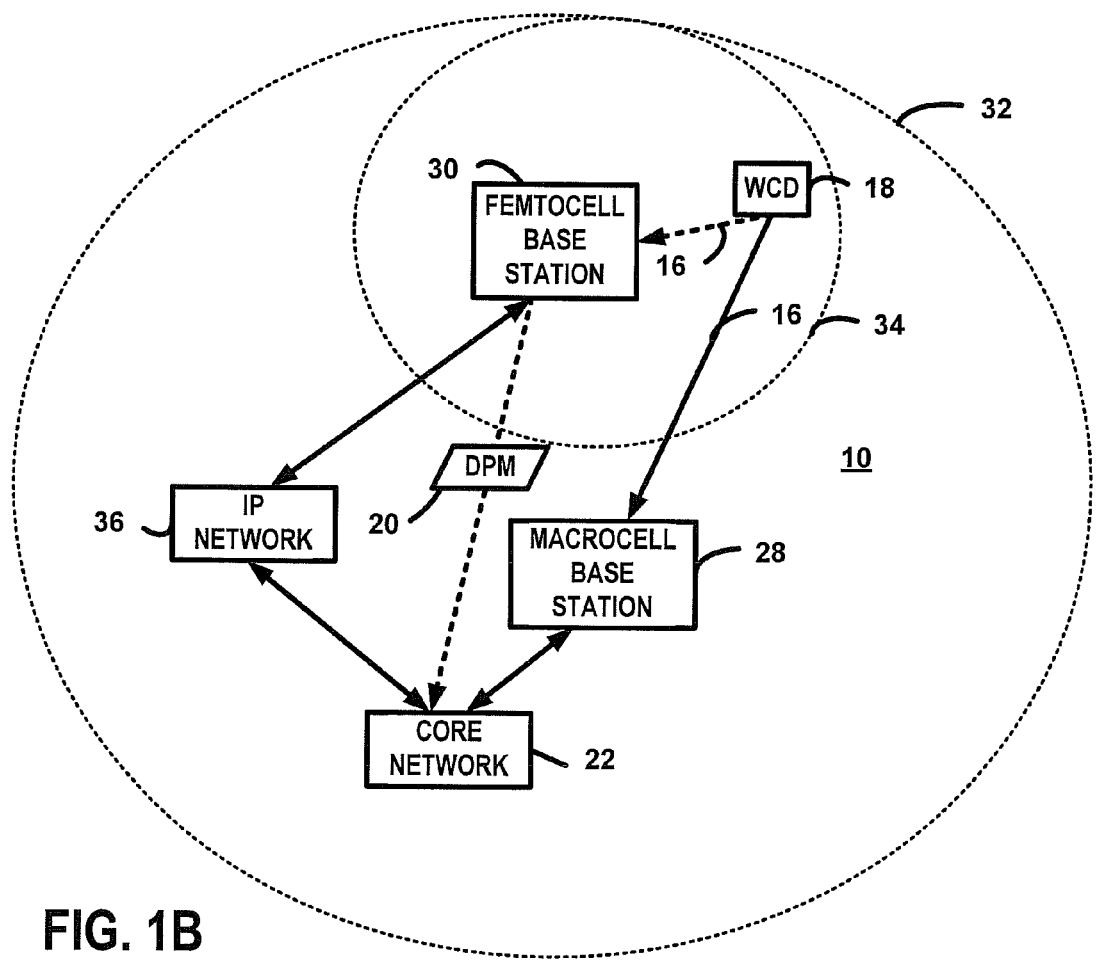
FIG. 1B is a block diagram of the communication system where the originating base station is a macrocell base station and the detecting base station is a femtocell base station (FBS).

FIG. 1B is a block diagram of the communication system 10 where the originating base station 12 is a macrocell base station 28 and the detecting base station 14 is a femtocell base station (FBS) 30. The communication system operates in accordance with a wireless wide area network (WWAN) technique and protocol such as UMTS, CDMA 2000 or WiMAX techniques. The macrocell base station 28 provides wireless services within a macrocell service area (macrocell) 32 and the femtocell base station 30 provides wireless communication services within a femtocell service area (femtocell) 34. Although the service areas 32, 34 are illustrated with circular dashed-line shapes, the service areas 32, 34 may be any shape or size geographical area. Further, the service areas 32, 34 may contain holes of coverage where service is unavailable. In the interest of clarity and brevity, such features are not illustrated in the figures. The femtocell service area 32 is significantly smaller than the macrocell service area 34 and may be positioned completely within the macrocell service 34, partially overlapping the macrocell service area 34, or may be adjacent to the macrocell service area 34.

The femtocell base station 30 communicates with a wireless wide area network (WWAN) communication system (core network) 22 and provides wireless service to one or more wireless communication devices 18. The exemplary communication system 10 discussed with reference to FIG. 1B, therefore, operates in accordance with a WWAN standard and at least provides wireless services within macrocells and femtocells. The exemplary communication system 10 operates using packet switching communication techniques. In such systems, the communication infrastructure is a packet switched core network and includes an access gateway for interfacing to the femtocell base station 30 using IP signaling. The exemplary communication system 10, however, may operate in accordance with circuit switched communications in some circumstances. For the examples discussed with reference to FIG. 1B and FIG. 6, the communication system 10 operates in accordance with UMTS standards and techniques. The communication system 10, however, may operate using any of numerous protocols and schemes. Examples of some Code Division Multiple Access (CDMA) standards include cdma2000 1x, 1xEV-DO, and W-CDMA. In some circumstances, the communication system 10 may operate with other standards such as OFDM based standards or GSM standards, for example. The various functions and operations of the blocks described with reference to the communication system 10 may be implemented in any number of devices, circuits, or elements. Two or more of the functional blocks may be integrated in a single device and the functions described as performed in any single device may be implemented over several devices. For example, at least portions of the functions of the core network 22 may be performed by the femtocell base station 30, macrocell base station 28, a base station controller, or an MSC in some circumstances.

The femtocell base station 30 is a scalable, multi-channel, two-way communication device similar to a typical base station within the particular communication system. The femtocell base station 30, however, is often implemented within a residence, business, or other relatively small area as compared to the macrocell and is connected to the core network through a packet switched network 36 such as intranet or the Internet. One example of a femtocell base station is a UMTS access point base station containing a Node-B, Radio Network Controller (RNC) and GSN, with an Ethernet or broadband connection to the Internet or an intranet. In some situations, the femtocell base station 30 may be connected to the packet switched network through an ATM/TDM connection. Application of VoIP allows the femtocell base station 30 to provide voice and data services in the same way as a typical base station, but with the deployment simplicity of a Wi-Fi access point. Other examples include CDMA-2000 and WiMAX base stations connected in a similar fashion. The femtocell base stations and the wireless communication devices operate in accordance with the existing radio access network (RAN) technologies.

The femtocell base station 30 provides wireless service to communication devices 18 within adequate range of the femtocell base station 30 within the femtocell 34. Messages sent from the femtocell base station 30 to the core network 22 may be sent using any combination of wired and/or wireless communication methods. In the exemplary embodiment discussed with reference to FIG. 1B, the femtocell base station 30 is connected to an access gateway in the core network and sends messages using packet switched data techniques, either through an IP network or through an access router using the network interface 26. In some circumstances, messages can be sent from the femtocell base station 30 through a PSTN. In other circumstances, a transmitter may be used to wirelessly transmit the messages to the macrocell base station 28 which are then forwarded to the core network 22. The femtocell base station 30, therefore, is connected to, and managed by, the core network 22 through the network interface similarly to other base stations in the systems except that the backhaul to the femtocell base station 30 may include a broadband CATV or DSL connection rather than fiber optic, T1, point-to-point microwave backhaul, or other similar backhauls.

The wireless communication device 18 is any type of communication device that is capable of communicating with the communication system 10. The wireless communication device 18, sometimes referred to as an access terminal (AT), may be a wireless modem, a personal digital assistant, cellular telephone, or other such device.

In accordance with the exemplary embodiment discussed with reference to FIG. 1B, the femtocell base station 30 manages wireless service to the communication device 18 based, at least partially, on the uplink signal 16 exchanged between the communication device 18 and the macrocell base station 28. As discussed above, the femtocell base station 30 sends the device proximity message 20 to the core network 22 based on the uplink signal 16. In the exemplary embodiment, the device proximity message 20 is a request message requesting the execution of base station handoff procedure. In response to the device proximity message 20, the core network 22 sends a message to the communication device 18 instructing the communication device 18 to search for wireless service from an alternate base station or to establish communication with an alternate base station. The instructions may include specific data identifying the femtocell base station 30 as a potential base station for service. Therefore, the device proximity message in the embodiment of FIG. 1B, may include a request to establish wireless service from the detecting base station 30 to the wireless communication device 18.

In some situations, the core network 22 may evaluate other parameters before instructing the communication device 18. For example, due to subscriber parameters, system settings, or system parameters, the core network 22 may determine that the communication device 18 should not be handed off to another base station. Further, the core network 22 may evaluate parameters corresponding to multiple base stations where device proximity messages identifying a particular communication device 18 are received from more than one femtocell base station 30.

Therefore, the core network 22 may perform an evaluation in response to the device proximity message 20 and may perform or initiate the handoff to the femtocell base station 30 in response to the device proximity message 20. In the exemplary embodiment, the device proximity message 20 is sent through either an IP network or an access router to an access gateway in the core network 22. In some circumstances, however, the device proximity message 22 is sent through a wireless link. For example, the message could be sent as an uplink signal where the femtocell base station 30 includes an uplink transmitter.

When the macrocell base station 28 is providing wireless communication services to the communication device 18, the femtocell base station 30, at least periodically, monitors the uplink channel used by the communication device 18 to transmit uplink signals. In some cases, the femtocell base station 30 may employ procedures to detect multiple communication devices 18. Based on the uplink signal 16 received at the femtocell base station 30, the femtocell base station 30 determines whether the communication device 18 should at least attempt a search for the femtocell base station 30. In some circumstances, the femtocell base station 30 determines that the femtocell base station 30 should provide service to the communication device 18. When the femtocell base station 30 determines that the communication device 18 is within range (or at least possibly with range) of the femtocell base station 30, the femtocell base station 30, transmits the device proximity message 20 to the core network 22 indicating that the communication device 18 is likely within the service area (femtocell 34) of the femtocell base station 30. The core network 22 then performs the handoff procedure which may include an instruction for the communication device 18 to search for femtocell base station 30. An example of a situation where the above scenario applies includes the situation where a communication device 18 is approaching the femtocell base station 30 while receiving communication services from macrocell base station 28.

Figure 1C:
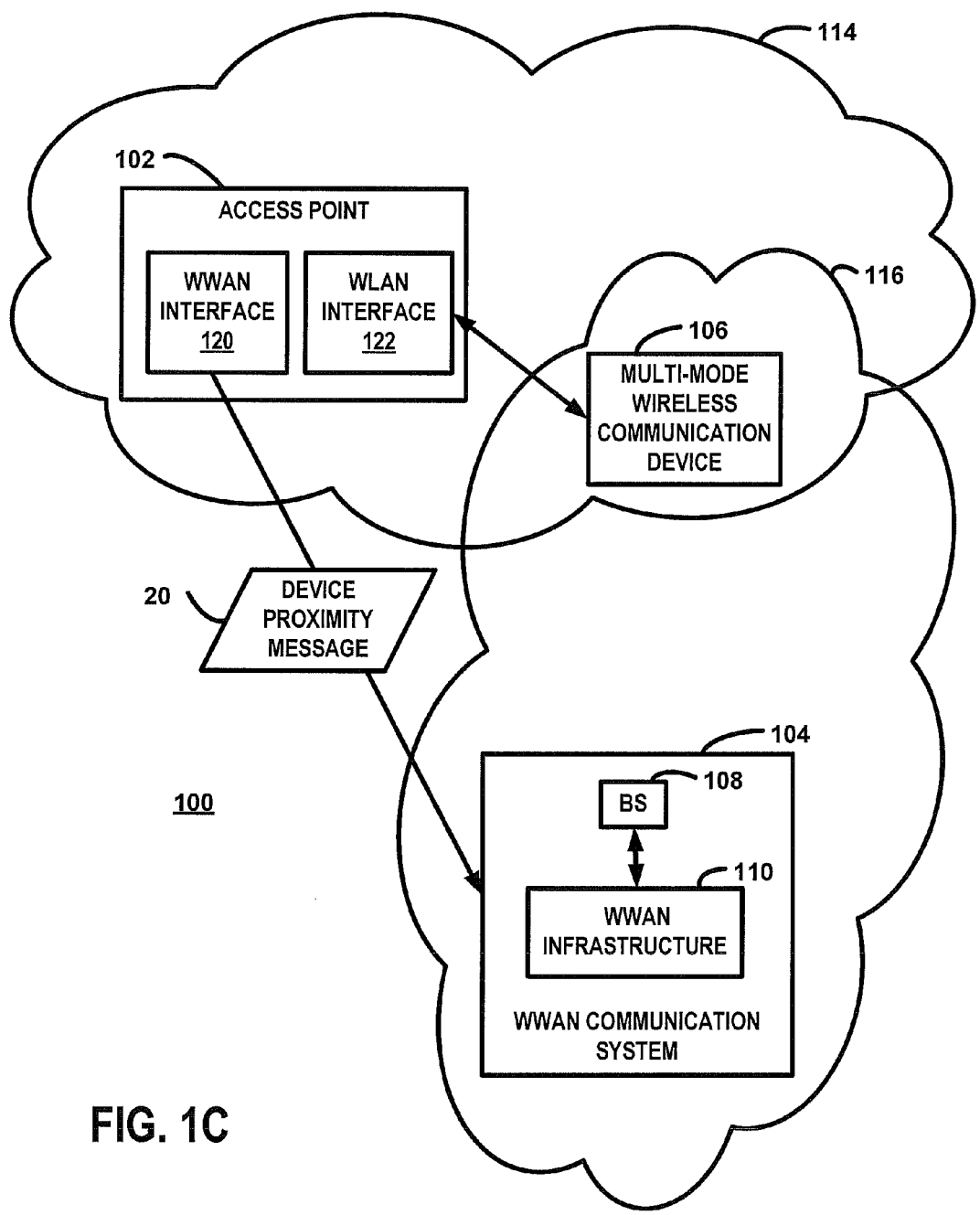
FIG. 1C is a block diagram of a communication arrangement with two communication networks using different communication technologies

FIG. 1C is a block diagram of a communication arrangement 100 with two communication networks using different communication technologies. For the example in FIG. 1C, the detecting base station 14 is a wireless local area network (WLAN) access point 102, the originating base station 12 is a wireless wide area network (WWAN) base station 108, and the wireless communication device 18 is a multimode wireless communication device 106. The access point 102 communicates with a wireless wide area network (WWAN) communication system 104 and provides wireless local area network (WLAN) service to one or more multi-mode wireless communication devices 106. As described above, the term WWAN is used primarily to distinguish this group of diverse technologies from WLANs that typically have smaller service areas on the order of 100 to 300 feet per base station (access point). Accordingly, the WWAN communication system 104 is any system that provides wireless communication services within relatively large geographical areas as compared to WLANs. Examples of WWAN systems 104 include cellular communication systems that provide cellular communication services through at least one base station 108 connected to a WWAN infrastructure 110 such as a cellular system infrastructure (110). The WWAN infrastructure 110 includes a core network 26 that is connected to a global network such as Internet Protocol (IP) network or public switched telephone network (PSTN). In the exemplary embodiments, the WWAN communication system 104 operates using packet switching communication techniques. In such systems, the communication infrastructure is a packet switched core network and includes an access gateway for interfacing to WLANs using IP signaling. The WWAN communication system 104, however, may operate in accordance with circuit switched communications in some circumstances. The WWAN communication system 104 may operate using any of numerous protocols and schemes. Examples of some Code Division Multiple Access (CDMA) standards include cdma2000 1×, 1×EV-DO, and W-CDMA. In some circumstances, the WWAN communication system 104 may operate with other standards such as OFDM based standards or GSM standards, for example. In the embodiment discussed with reference to FIG. 1C through FIG. 5, the WWAN system 106 is an OFDM system that operates in accordance with IEEE 802.16(e) standards such as WiMax. The various functions and operations of the blocks described with reference to the WWAN communication system 104 may be implemented in any number of devices, circuits, or elements. Two or more of the functional blocks may be integrated in a single device and the functions described as performed in any single device may be implemented over several devices. For example, at least portions of the functions of the WWAN infrastructure 110 may be performed by the base station 108, a base station controller, or the MSC in some circumstances.

The access point 102 is any device capable of providing wireless local area network (WLAN) services and that can send messages to the WWAN communication system 104. Although the access point 102 is a fixed access point that is connected through a wired backhaul to an IP network in the exemplary embodiment, the access point 102 may be a cellular mobile gateway that is connected through a cellular communication link, or other WWAN link, to a WWAN. The access point 102 provides WLAN service to communication devices 108 within adequate range of the access point 102. An example of suitable technique for providing WLAN service includes operation in accordance with a WLAN protocol such as WiFi or any of the protocols defined in the IEEE 802.11 standards. Messages sent from the access point 102 to the WWAN infrastructure 110 may be sent using any combination of wired and/or wireless communication methods. In the exemplary embodiment, the access point 102 is connected to an access gateway in a core network and sends messages using packet switched data techniques, either through an IP network or through an access router. In some circumstances, messages can be sent from the access point 102 through a PSTN. In other circumstances, a transmitter may be used to wirelessly transmit the messages to the base station 108 which are then forwarded to the WWAN infrastructure 110.

The multi-mode wireless communication device 106 is any type of communication device that is capable of communicating with at least one WLAN system and at least one WWAN system 104. The multi-mode wireless communication device 106, sometimes referred to as an access terminal, may be a wireless modem, a personal digital assistant, dual mode cellular telephone, or other such device.

Accordingly, the access point 102 facilitates communication to a WLAN 114 and the WWAN communication system 104 facilitates communication to a WWAN 116, where the communication device 106 is capable of communicating on both of the networks 114,116. The communication device 106 can access wireless services provided by either of the networks 114, 116 when resources are available on the particular network and signal quality is adequate. In the exemplary embodiment, the communication device 106 may access both networks 114, 116 simultaneously under certain conditions. In some circumstances, however, the communication device 106 may be able only to access one of the networks 114, 116 at any given time. In another scenarios, the communication device 106 may be able to access only control channels of the network 116 but have full access of network 114 or vice versa. The clouds shown in FIG. 1C symbolize networks and do not necessarily illustrate coverage areas of the networks 114, 116. For example, the geographical coverage area of the WWAN 116 may include one or more coverage areas of WLANs 114 provided by access points 102. Further, the coverage area of the WWAN 116 may have poor quality areas or areas where no WWAN service is available. The areas, however, may have good coverage from a WLAN 114. Such a scenario may occur where the WLAN coverage is within a building such as an office or home and the WWAN coverage is generally available in the area of the building but lacking within the building due to walls and other signal obstructions. In addition to other advantages, managing wireless services in accordance with the exemplary embodiments maximizes the quality of the wireless services provided to the communication devices 106.

In accordance with the exemplary embodiment discussed with reference to FIG. 1C, the access point 102 manages wireless service to the communication device 106 based, at least partially, on a WWAN signal exchanged with the communication device 106. The WWAN signal may be an uplink WWAN signal transmitted from the communication device 106 or a downlink WWAN signal received at the communication device 106. The access point 102 sends a device proximity message 20 to the WWAN communication system 104 based on the WWAN signal exchanged with the communication device 106. In the exemplary embodiment, the device proximity message 20 is a request message requesting the execution of an alternate network acquisition procedure. In response to the device proximity message 20, the WWAN infrastructure 110 sends a message to the communication device 106 instructing the communication device 106 to search for wireless service from an alternate network or to establish wireless service from an alternate network, where the alternate network is a network different than a current network currently providing service to the multi-mode wireless communication device. Where the current network is the WWAN network 116, the alternate network is the WLAN network 114 and where the current network is the WLAN network 114, the alternate network is the WWAN network 116. In some situations, the WWAN infrastructure 110 may evaluate other parameters before instructing the communication device 106. For example, due to subscriber parameters, system settings, or system parameters, the WWAN infrastructure may determine that the communication device 106 should not acquire an alternate network. Further, the WWAN system 104 may evaluate parameters corresponding to multiple access points where device proximity messages identifying a particular communication device 106 are received from more than one access point.

Therefore, the WWAN communication system 104 at least performs an evaluation in response to the device proximity message 20 and may perform or initiate the acquisition of the alternate wireless service to the communication device 106 in response to the device proximity message 108. The acquisition may result in a handoff of the communication device 106 from the current network to the alternate network in some circumstances or may result in the communication device 106 receiving wireless service from two networks simultaneously. Further, the communication device 106 may maintain registration with the current network although user data is only exchanged on the alternate network. In the exemplary embodiment, the device proximity message 20 is sent through either an IP network or an access router to an access gateway in the WWAN. In some circumstances, however, the device proximity message 20 is sent through a wireless link. For example, the message could be sent as an uplink WWAN signal where the access point 102 includes a WWAN transmitter.

When the WWAN communication system 104 is providing wireless communication services to the communication device 106, the access point 102, at least periodically, monitors the WWAN uplink channel used by the communication device 106 to transmit WWAN uplink signals. In some cases, the access point 102 may employ procedures to detect multiple multi-mode communication devices 106. Based on the WWAN uplink signal received at the access point 102, the access point 102 determines if the communication device 106 should at least search for WLAN service. In some circumstances, the access point 102 determines that the access point 102 should provide WLAN communication service to the communication device 106. When the WLAN determines that the communication device 106 is within range of the access point 102, the access point 102 transmits the device proximity message 20 to the WWAN communication system 104 indicating that the communication device 106 is likely within the service area of the WLAN network 114. The WWAN system 104 then performs the alternate network acquisition procedure which may include an instruction for the communication device 106 to search for WLAN service, to search for a particular access point 102, and/or to acquire WLAN service. As described in further detail below, an example of a situation where the above scenario applies includes the situation where a communication device 106 is approaching the access point 102 while receiving communication services from a WWAN.

In addition to managing wireless service as described above, the access point 106 may perform other monitoring and management procedures. For example, when the access point 102 is providing wireless communication services to the communication device 106, the communication device 106, at least periodically, monitors the WWAN downlink signals and transmits a status message to the access point 102. The downlink signals may include control signals and pilot signals as well as other information. Based on the WWAN downlink signal received at the communication device 106, the access point 102 determines if the WWAN communication system 104 should provide WLAN communication service to the communication device 106. When the WLAN determines that WWAN service should be provided or should be evaluated, the access point 102 transmits the device proximity message 20 to the WWAN communication system 104 to alert the WWAN system 104 of the potential for acquisition of the WWAN service or a handoff to WWAN service. As described in further detail below, an example of a situation where this scenario applies includes the situation where communication device 106 is traveling away from the access point 102 while receiving communication services form the access point 102. The access point 102 at least performs some decision making based on a WWAN DL signal received at the communication device 106 that acquisition of the WWAN service may be desired.

For the example in FIG. 1C, the device detector 24 and the network interface are implemented with at least portions of a WWAN interface 120. The WWAN interface 120 includes any combination of hardware, software and/or firmware adequate to at least detect WWAN RL signals and to send the device proximity message 20 to the WWAN system 104. As described below in further detail, the WWAN interface 120 is connected through a network interface to an access router and an IP network. The device proximity message 20 is transmitted through the network interface to WWAN infrastructure 110. In the exemplary embodiment, the WWAN interface also includes a WWAN DL receiver for receiving WWAN DL signals. In some circumstances the WWAN interface 120 may also include a WWAN transmitter.

A WLAN interface 122 includes any combination of hardware, software and/or firmware for communicating with one or more communication devices 102. As discussed below, the WLAN interface 122 includes a WLAN transmitter and a WLAN receiver.

Figure 2:
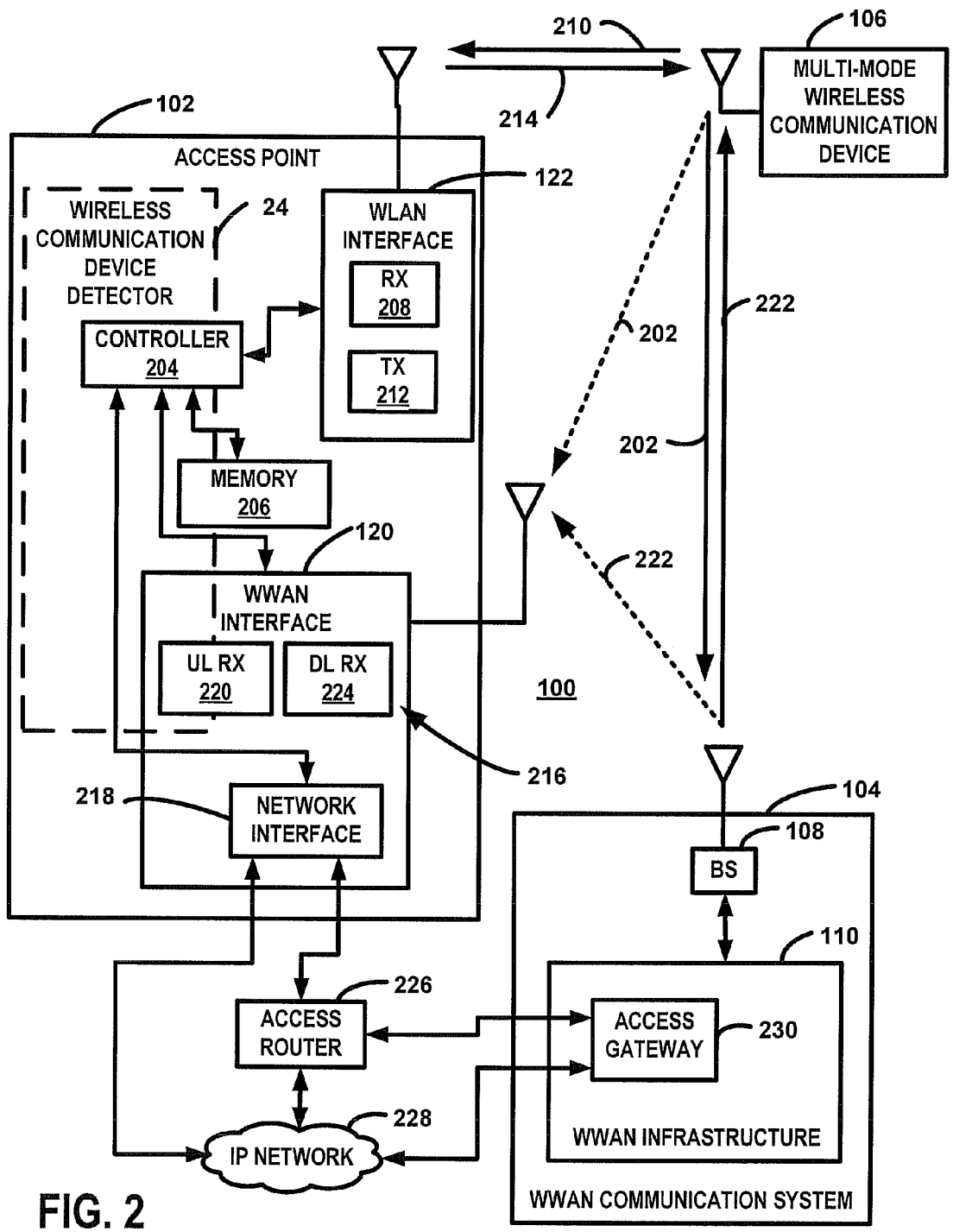
FIG. 2 is a block diagram of the communication network arrangement where the access point receives uplink WWAN signals from the communication device.

FIG. 2 is a block diagram of the communication network arrangement 100 of FIG. 1C where the access point 102 receives uplink (UL) WWAN signals 202 from the communication device 106. The access point 102 includes the WWAN interface 120 for communicating with the WWAN system 106 and the WLAN interface 122 for providing WLAN service to one or more communication devices such as the multi-mode wireless communication device 106. The access point 102 further comprises a controller 204 coupled to the WWAN interface 110 and the WLAN interface 122. The controller 204 performs the control functions described herein as well as performing other functions and facilitating the overall operation of the access point 102. The controller 204 is connected to, or includes, a memory 206 that may include one or more random access memory (RAM) and/or read only memory (ROM) memory devices. The WLAN interface 122 includes a WLAN receiver 208 for receiving uplink (UL) WLAN signals 210 and a WLAN transmitter 212 for transmitting WLAN signals 214. The signals 210, 212 are transmitted and received in accordance with a WLAN protocol. Examples of a suitable WLAN protocols include protocols in accordance with the IEEE 802.11 protocol and wireless fidelity (WiFi). In some circumstances, the access point 102 may also include a wired LAN interface (not shown) for communicating with devices connected to the access point 102 through wires.

The WWAN interface 120 includes a WWAN receiver 216 that can be configured to at least receive uplink WWAN signals 202 transmitted from a multi-mode wireless communication device 106. The WWAN interface 120 is also configured to send the device proximity message 20 to the WWAN infrastructure 110 through a network interface 218. In the exemplary embodiment, the WWAN receiver 216 can be configured as an uplink WWAN receiver 220 for receiving uplink WWAN signals 202 and as a downlink WWAN receiver 224 for receiving WWAN downlink signals 222 from a base station 108. In some circumstances, two separate WWAN receivers may be used to implement the WWAN uplink and downlink receivers 220, 224. Also, in some implementations, the capability to receive WWAN downlink signals 222 may be omitted.

The network interface 218 exchanges messages with an access router 226 and an Internet protocol (IP) network 36. The network interface 218 provides packet data communications and facilitates access to the Internet and to an access gateway 230 in the WWAN infrastructure 110 through the access router 226. In some circumstances, at least portions of the network interface 218 may be implemented separately from the WWAN interface 120. The access router 226 may be connected to several access points 102 and provides communication management and control functions to the WLAN. In some situations, the access router 226 may be implemented within an access point 102 or may be eliminated. In some circumstances the connection between the access gateway 230 and the access point 102 may include a wireless communication link such as satellite communication link or point-to-point microwave link, for example.

In addition to other information, the memory 206 stores communication device identification values corresponding to each communication device 106 that is authorized to use the access point 102. The communication device identification value may include an electronic serial number (ESN) or other unique data. An example of a group of identification values stored in memory includes a collection of ESNs corresponding to the communication devices of the family members of a household where the access point 102 provides WLAN service. The identification values may be stored at the access point 102 using any of numerous techniques. An example of a suitable method of storing the values includes storing the values during an initialization procedure performed when the access point 102 is installed. In some implementations, the identification values may be omitted or the access point 102 may allow communication devices that do not have corresponding identification values stored at the access point 102 to receive WLAN service from the access point 102.

The access point 102 monitors the uplink WWAN channel (s) that may contain an uplink WWAN signal 202 transmitted from a communication device 106 that is not currently receiving WLAN service from the access point 102. The uplink WWAN receiver 220 is tuned, or otherwise configured, to receive the uplink WWAN signals 202. Based on one or more received WWAN RL signals 202, the controller 204 determines the proximity of the communication device 106 to the access point 102. An example of suitable technique for determining the proximity includes evaluating a power level of the received RL WWAN signal. In some circumstances, the detection of a RL WWAN signal from the communication device 106 may be sufficient to determine that the communication device 106 is within a proximity range. In the exemplary embodiment, the proximity is used to determine whether the communication device 106 is possibly within range of the access point 102 and possibly able to receive WLAN service. Therefore, the controller 204 at least determines whether the communication device is possibly within WLAN range of the access point 102. The controller 204 may determine whether to generate and send the device proximity message 20 based on factors other than power level of the signal. For example, factors may include only the power level of the WWAN RL signal or on a factor based solely on the WWAN RL receiver's 220 ability to decode the incoming RL signal. The device proximity message 20 initiates an alternate network acquisition procedure that may result in an attempt by the communication device 106 to acquire wireless service from the access point 102 in the exemplary embodiment. The determination to generate the device proximity message 20, therefore, may be based on other criteria in addition to the proximity. Any of numerous criteria may be used to determine if WLAN service should be acquired where the criteria may include conditions related to the capacity of the access point 102 and/or the requirements of the communication device 106. The controller 204 uses the WWAN RL signal to determine if the communication device 106 is possibly within the service area of the access point 102. The criteria used to determine whether the communication device 106 is within the service area of the access point 102 depends on the type of WWAN.

Any of several techniques may be used to determine the proximity of the communication device 106 based on the WWAN RL signal. In the exemplary embodiment discussed below in further detail, a downlink WWAN signal transmitted from the base station to the communication device 106 is intercepted by the access point 102 and decoded to determine uplink scheduling information. Based on the difference in received power and transmitted power of the WWAN RL signal, the access point 102 determines the distance. The access point 102 may also determine distance based on the difference between the arrival time and transmission time of the WWAN RL signal. In another example, the access point 102 may determine that the communication device 106 sufficiently close to generate the device proximity message 20 if the received power level is above a threshold without information regarding the transmission power level. Another example of a suitable technique of determining proximity includes utilizing multiple antennas or smart antennas to determine the proximity of the communication device 106 to the access point 102 based on the uplink WWAN signal transmitted by the communication device 106. For example, beam forming antennas may provide distance information to allow the controller to determine whether the communication device 106 is within the WLAN service area. Other techniques or combinations of techniques may be used.

In this embodiment, the WWAN infrastructure 110 comprises a packet switched core network that includes at least one access gateway 230. The access router 226 may be connected to the access gateway 230 using any combination of wired and wireless connections. Examples of suitable connections include T1 lines, fiber optic cable, coaxial cable, and point-to-point microwave. The access gateway 230 is a communication interface that allows the access point 102 to communicate with the WWAN infrastructure.

During operation, information regarding the power level is determined by intercepting the WWAN DL signals that contains uplink scheduling information corresponding to each communication device 106. In the exemplary embodiment, information is extracted from the UL MAP transmitted in the WWAN DL signal. The controller 202 maintains a frequency and timing information for reverse link transmission for each communication device associated with each stored identification value. Also, signal timing information extracted from the downlink WWAN signal may be used to calculate a WWAN RL signal propagation time of the WWAN RL signal and, therefore, the proximity of the communication device 106. During system initialization of the access points, the default power level is stored in memory 206. Any adjustments to the transmission power level for a particular communication device 106 are forwarded to the access point 102 and updated in memory 206. In some circumstances, transmission power level updates may not be available and the access point uses the default values for proximity calculations. The access point determines the proximity or a proximity estimate based on the measured propagation loss of the transmitted uplink signal and propagation time. In some situations, a combination of propagation time, propagation loss, and other parameters may be used to determine the proximity.

After determining the proximity of the communication device 106 to the access point 102, the controller 202 determines whether the access point 102 should provide WLAN service to the communication device 106. If the controller 202 determines that the access point 102 should provide WLAN service to the communication device 106, the controller 202 generates a device proximity message 20. The message 20 is sent to the WWAN communication system 104 either through the access router 226 or through the IP network 36.

The device proximity message 20 includes at least information identifying the communication device 106 that results in an interpretation by the WWAN infrastructure 110 that WLAN service may be available to the communication device. The device proximity message 20, however, may include additional information such, for example, information identifying the access point 102, the calculated or estimated proximity of the communication device 106 to the access point 102, and available capacity on the access point 102. Access point identification information may include a SSID of the access point 102. Further, the device proximity message 20 may contain security protocol that assists the core network in identifying the access point 102. The WWAN infrastructure may perform additional analysis to determine what instructions, if any, will be sent to the communication device. In some situations, the WWAN infrastructure (core network) 110 sends an instruction to the communication device 106 indicating that the communication device 106 should search for a WLAN system. In response to the instruction, the communication device 106 activates and tunes the WLAN interface 122 to search for a WLAN signal in accordance with known techniques. In other situations, the WWAN infrastructure (core network) 110 sends an instruction to the communication device 106 indicating that the communication device 106 should search for the specific access point 102 that sent the device proximity message 20. In other situations, the WWAN infrastructure (core network) 110 may instruct the communication device 106 to acquire WLAN service.

Figure 3:
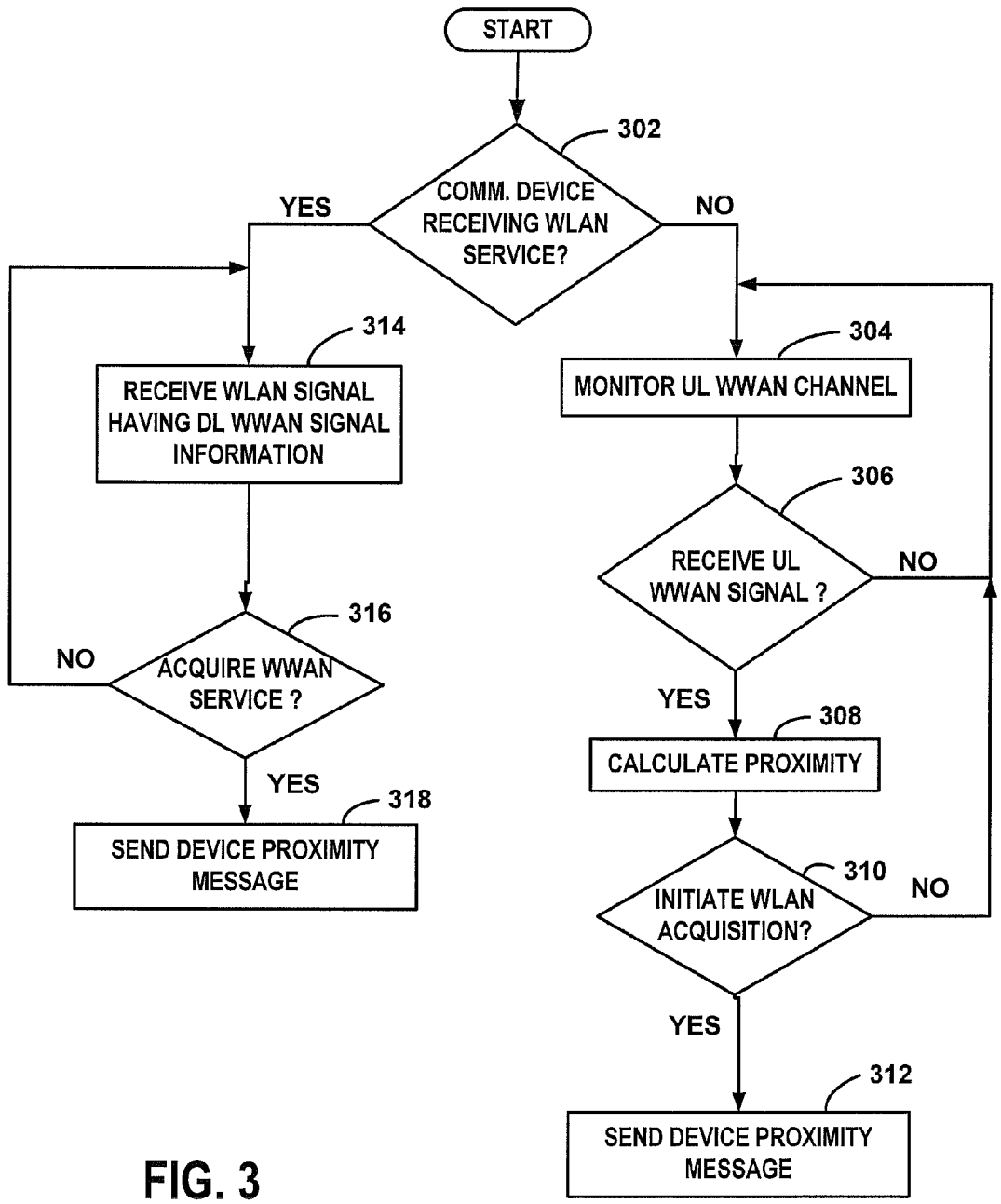
FIG. 3 is a flow chart of a method of managing wireless service to a multi-mode wireless communication device in accordance with the exemplary embodiment.

FIG. 3 is flow chart of a method of managing wireless service to a multi-mode wireless communication device 106 implemented with the arrangement 100 of FIG. 1C. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 204 in the access point 102.

At step 302, it is determined whether the communication device 106 is receiving WLAN service. If the communication device 106 is currently communicating with the access point 102, the method continues at step 314. Otherwise, the method continues at step 304. Accordingly, step 304 through step 312 are performed in the exemplary embodiment for a communication device 106 that is identified in the user list but is not currently receiving WLAN communication service from the access point 102. Step 314 through step 318 are performed when the communication device 106 is in communication with the access point 102. In some circumstances, steps 314-318 can be omitted.

At step 304, the WWAN uplink (UL) channel is monitored. In the exemplary embodiment, the WWAN RL receiver 220 is tuned to decode any WWAN RL signals 222 transmitted from any of the communication devices 106 in the user list. The uplink scheduling information enables more efficient RL monitoring. The access point 102 may detect communication devices 106 that are not in the user list but will not be able to decode the signals without identification information. In some circumstances, however, the WWAN RL receiver 220 may be configured to monitor all RL channels.

At step 306, it is determined whether the WWAN RL receiver 220 has received a WWAN RL signal. In the exemplary embodiment, the controller 204 determines whether a WWAN RL signal has been received from a communication device listed in the user list. If a WWAN RL signal has been received, the method continues at step 308. Otherwise, the method returns to step 304 to continue monitoring the WWAN RL channels.

At step 308, the proximity of the communication device 106 to the access point 102 is calculated. The proximity calculation may be based on any number of parameters or characteristics of the received WWAN RL signal as well as other factors. Examples of suitable parameters include parameters related to signal power level and a timing offset between a transmission and reception times. Other related factors may include transmission power level, location of one or more WWAN base stations and information extracted from WWAN RL signals and WWAN DL signals such as time stamps, power level indicators, and power control indicators. In some circumstances, the proximity is based only on a detection of the WWAN RL signal. The particular factors and calculation techniques depend on the type of WWAN communication system 104. An exemplary technique suitable for an OFDM based system IEEE 802.16 is discussed with reference to FIG. 5 below.

At step 310, it is determined whether the communication device 106 should acquire WLAN service. Although the determination may be based solely on the proximity of the communication device 106 to the access point 102, other factors may be considered in some circumstances. Examples of other factors include the capacity of the access point 102, the required bandwidth required by the communication device, the current cost of the WWAN service and the estimated motion of the communication device. If the controller determines that WLAN service should be acquired, the method continues at step 312, otherwise, the method returns to step 304. In some circumstances, this step may be omitted and the access point 102 may send proximity information to the WWAN with other information to allow the WWAN system 104 to make the determination of whether a communication device 106 should acquire WLAN service from the access point 102.

At step 312, a device proximity message 20 is sent to the WWAN communication system 104. For this example, the message 20 is transmitted by the WWAN interface 120 through either the IP network 36 or through the access router 226 to the WWAN communication system 104. As discussed above, the device proximity message 20 at least indicates that the communication device 106 may be within range of the access point 102 although other indications and information may be included. The access point 102 may transmit the message using other techniques. In some circumstances, for example, the message 20 may be transmitted through a WWAN RL channel to the base station 108. The WWAN system 104 may initiate acquisition of the WLAN service, initiate searching for WLAN service or may initiate a handoff to the access point 102.

At step 314, a WLAN signal that contains DL WWAN signal information is received. In the exemplary embodiment, a WWAN status message is transmitted by the communication device 106 to the access point 102. The WWAN status message may include WWAN DL power level information or other information related to the WWAN DL signals received at the communication device.

At step 316, it is determined whether WWAN service should be acquired. The controller 204 may evaluate any of number of factors or combinations of factors to determine whether WWAN service should be acquired for the communication device where at least one of the factors is base on the WWAN status message received from the communication device 106. Examples of factors include WWAN DL power level, WWAN signal to noise ratio, WLAN RL power level, WLAN DL power level, level of service, and service costs. If the controller 204 determines that WWAN service should be acquired, a device proximity message is sent to the WWAN system at step 318. Otherwise, the method returns to step 302.

At step 318, a device proximity message is sent to the WWAN system 104 indicating that the communication device 106 is positioned at a local where WLAN service is marginal and where WWAN service may provide increased performance. In response, the WWAN system 104 evaluates the circumstances and initiates a handoff or instructs the communication device 106 to acquire WWAN service. In some circumstances, the access point 106 may instruct the communication device 106 to acquire WWAN service by sending a message to the communication device 106. In other circumstances, the access point 102 may instruct the communication device 106 to evaluate services and acquire WWAN service is warranted.

Steps 314, 316, and 318 may be omitted in some circumstances. For example, the status of WWAN service may be determined or received at the WWAN system 104 and forwarded to the access point through the access gateway 230. In other situations, the WWAN system 104 may make all WWAN service acquisition determinations and the access point is not required to receive any WWAN service status information.

Figure 4:
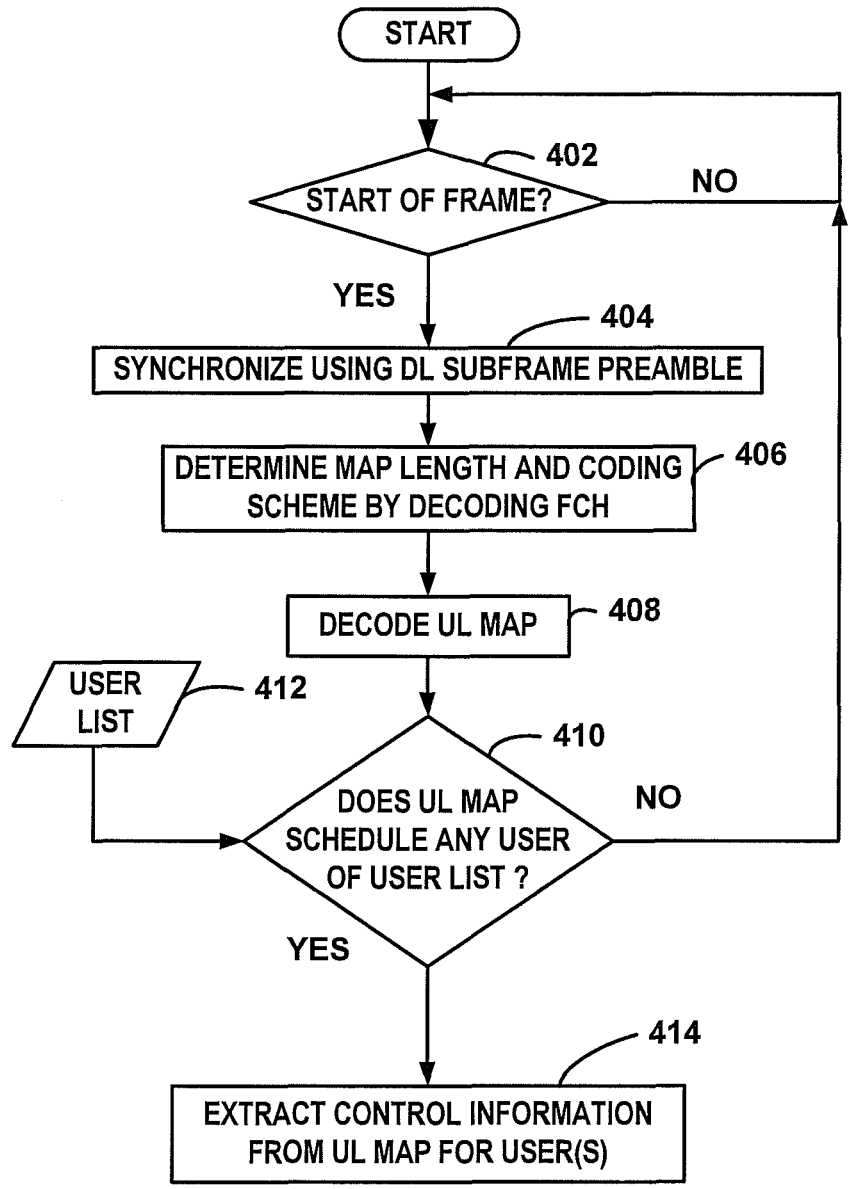
FIG. 4 is a flow chart of a method of monitoring a WWAN DL channel at an access point where the WWAN system operates in accordance with in accordance with the IEEE 802.16 standard.

FIG. 4 is a flow chart of a method of monitoring a WWAN DL channel at an access point 102 where the WWAN system 104 operates in accordance with OFDM techniques. The exemplary method operates within an OFDMA system that functions in accordance with IEEE 802.16(e) protocols. The method described with reference to FIG. 4 is an example of suitable technique for acquiring information that allows the access point 102 to monitor the uplink WWAN channels. As discussed with reference to FIG. 4 and FIG. 5, the downlink (DL) WWAN signal and WWAN DL channel are referred to as downlink (DL) signals and downlink (DL) channels and correspond to communications from an OFDMA base station, sometimes referred to as an access node (AN), to the communication device 106. As discussed with reference to FIG. 4 and FIG. 5, uplink (UL) WWAN signals and WWAN RL channels are referred to as uplink (UL) signals and uplink (UL) channels and correspond to communications from the communication device 106 to the OFDMA base station. As is known, IEEE 802.16(e) standards (WiMax) can operate in a time division duplex (TDD) or frequency division duplex (FDD) scheme. In the exemplary embodiment, the system operates in TDD mode. Those skilled in the art will readily apply the teachings herein to implement the system in FDD mode. In a TDD mode, each frame is split into a downlink (DL) sub-frame and an uplink (UL) sub-frame. The DL sub-frame includes a preamble, control information and other broadcast messages and packets. The control information includes DL and UL MAPs. Each communication device 106 is assigned a specific set of frequencies for receiving respective data packets. Each communication device 106 is also assigned a set of frequencies for transmitting in the UL.

At step 402, the controller 202 locates the start of a DL frame. When the start of the frame is found, the method continues at step 404. Otherwise, the step 402 is repeated.

At step 404, the WWAN DL receiver 226 acquires and synchronizes to the incoming signal using the DL sub-frame preamble. The WWAN DL receiver 226, therefore, performs the functions of a DL receiver in the exemplary method.

At step 406, the Frame Control Header (FCH) is decoded to determine the DL data burst length and coding scheme. In the exemplary method, the FCH burst is followed by the preamble. In networks operating in accordance with IEEE 802.16 standards, an uplink map (UL MAP) is a Medium Access Control (MAC) message that defines burst start times and frequencies on the UL channels for each communication device 106.

At step 408, the UL MAP is decoded. Accordingly, the received DL signals provides information in the UL MAP that allows the controller 202 to determine the timing of UL signals and carrier frequencies assigned to the communication device 106. In addition, the UL MAP includes user identification (ID) information corresponding to communication devices that are receiving the DL signals from the base station (access node).

At step 410, it is determined whether one or more of the communication devices listed in a user list 412 at the access point 102 are contained in the UL MAP. The user list 412 includes identification information that uniquely identifies communication devices that are supported by the access point 102. For example, the IEEE 802.16(e) standard uses manufacturer-issued X.509 digital certificates to identify devices. The user list 412 is typically programmed at the time of installation of the access point 102 and may be modified to add or remove user IDs. The users may be members of a household that reside where the access point 102 is installed. If no user IDs in the user list are contained in the UL MAP, the method returns to step 402. Otherwise, the method continues at step 414. In some circumstances, the UL MAP may not contain an explicit identification number and may include indirect identification information that can be used to determine the identity of the communication device 106.

At step 414, the control information for all of identified users is extracted from the UL MAP or other control messages. The control information is the transmission RL control information that includes a RL transmission power level and a RL transmission time for the WWAN RL signals transmitted by the communication devices 106. The timing information corresponding to the identified communication device is extracted from the decoded UL MAP and stored in memory.

Figure 5:
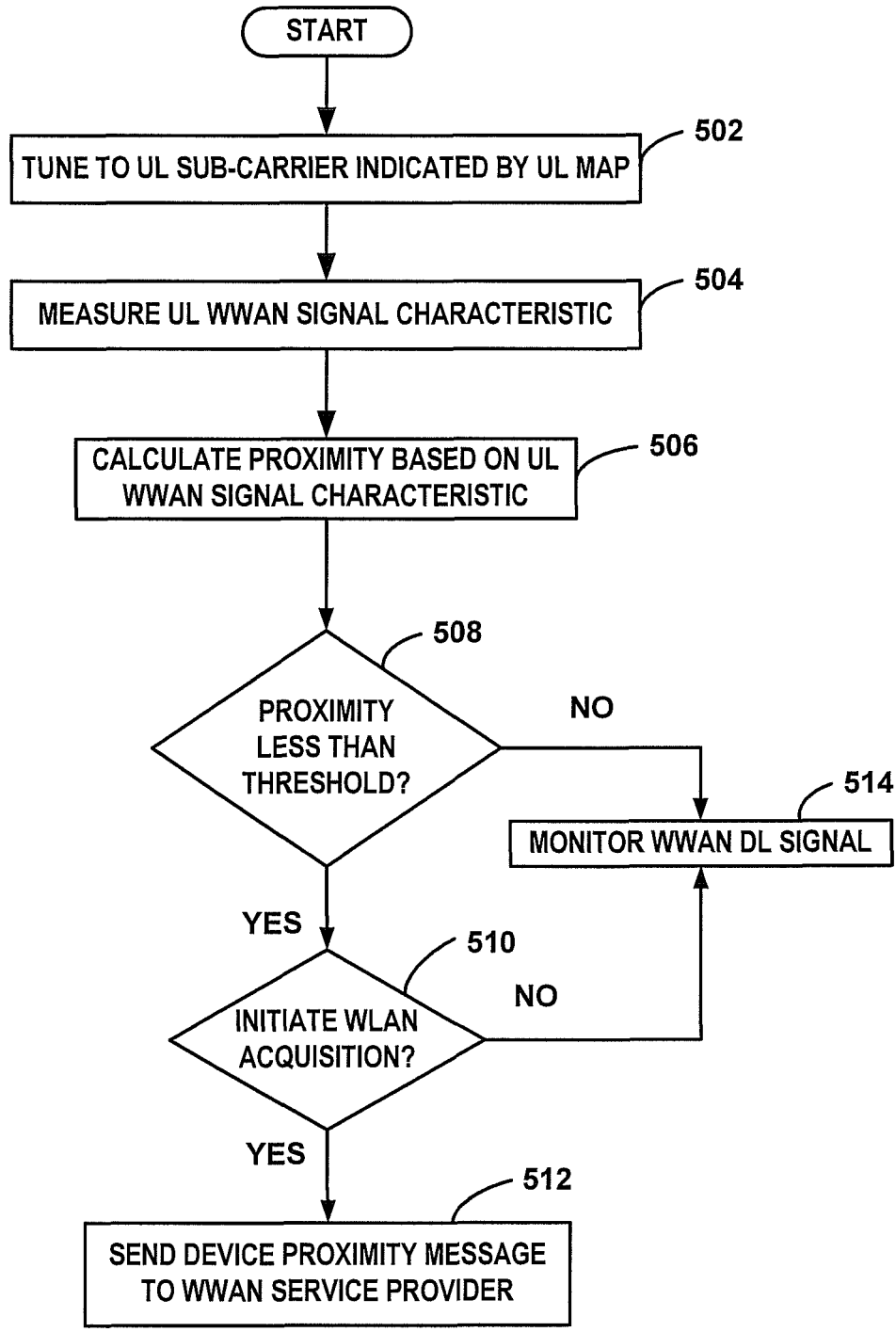
FIG. 5 is a flow chart of an exemplary method of managing wireless resources where the WWAN system operates in accordance with the IEEE 802.16 standard.

FIG. 5 is a flow chart of an exemplary method of managing wireless resources where the WWAN system 104 operates in accordance with OFDMA based system such as IEEE 802.16 (e). The exemplary method is performed by the access point 102 and includes monitoring a WWAN RL channel and initiating an acquisition of WLAN service to the communication device 106 based on a received WWAN RL signal. As explained above, the WWAN RL signals and WWAN RL channels are referred to as UL signals and UL channels with reference to FIG. 5. Using the information determined with the method discussed with reference to FIG. 4, the access point 102 monitors the UL WWAN channel and sends a WLAN acquisition message if certain criteria met. Accordingly, steps 502-514 provide an exemplary technique for performing steps 304-312 discussed with reference to FIG. 3 above.

At step 502, the WWAN receiver 216 is tuned to the UL sub-carrier frequency indicated by the UL map. The UL sub-carrier frequency extracted in step 414 is used to tune the WWAN RL receiver 224. In some situations, a single receiver may be tuned to both uplink and downlink frequencies. In the exemplary embodiment, the receiver 216 can simultaneously receive UL and DL signals.

At step 504, the characteristics of the received UL WWAN signal is measured. In the exemplary embodiment, the controller 202 determines the power level and the reception time of the received UL signal. In some situations only the reception time or the power level is determined. Using known techniques, the power of the received UL WWAN signal is measured and stored in memory. The reception time is determined relative to the system time and stored in memory. Other signal characteristics may be determined in some circumstances where the signal characteristics provide information regarding the proximity of the communication device 106 to the access point 102. In the exemplary embodiment, the identification information is used to identify the communication device 106 only and not to decode the signals in order to minimize cost. In some implementations, however, the identification information may be used to decode the WWAN RL signals.

At step 506, the controller 106 calculates the proximity of the communication device 106 transmitting the UL signal to the access point 102. Based on the characteristics of the UL signal, the controller 204 determines the distance from the access point 102 to the communication device 106. Using the transmission time of the WWAN UL signal determined from the UL MAP and reception time, the controller 204 calculates a propagation time of the signal. The propagation attenuation of the signals is determined by calculation the difference between the transmission power and the reception power. Using either or both of the propagation parameters, the controller 204 calculates the proximity of the communication device 106 to the access point 102. For example, the distance may be determined by multiplying the propagation time by the speed of light. The distance may also be calculated by comparing the propagation loss to a known propagation loss per distance function for the antennas. The distance values may be averaged or otherwise processed to determine the proximity.

At step 508, it is determined whether the proximity of the communication device 106 to the access point 102 is less than a threshold. The threshold may be based on any of several factors and may be dynamic or static. In the exemplary embodiment, the threshold is the maximum distance between the communication device 106 and the access point 102 where the access point 102 can provide WLAN service to the communication device. If the proximity is less than the threshold, the method continues at step 510. Otherwise, the method continues to step 514 where the procedure includes returning to step 402 of FIG.

At step 510, it is determined whether the communication device 106 should acquire WLAN service. Although the determination may be based solely on the proximity of the communication device 106 to the access point 102, other factors may be considered in some circumstances. Examples of other factors include the capacity of the access point 102, the required bandwidth required by the communication device 106, the current cost of the WWAN service and the estimated motion of the communication device 106. If the controller determines that WLAN service should be acquired, the method continues at step 512, otherwise, the method returns to step 514. In some situations, this step can be omitted and the access point 102 may send proximity information to the WWAN system 104 where the WWAN system 104 determines whether the communication device 106 should acquire WLAN service.

At step 512, a device proximity message 20 is sent to the WWAN service provider. The message includes information that when interpreted by the WWAN results in instruction from the WWAN system 104 to the communication device 106 resulting in the search for the access point 102. In some circumstances the acquisition may result in a handoff from the WWAN system to the WLAN system. In other circumstances, service may be maintained from the WWAN system 104 or the communication device 106 may remain registered on the WWAN system 104 although no user data is transmitted over the WWAN communication channels. Accordingly, step 510 provides an exemplary technique of performing step 312 where the WWAN communication system 104 operates in accordance with IEEE 802.16(e) standards.

Figure 6:
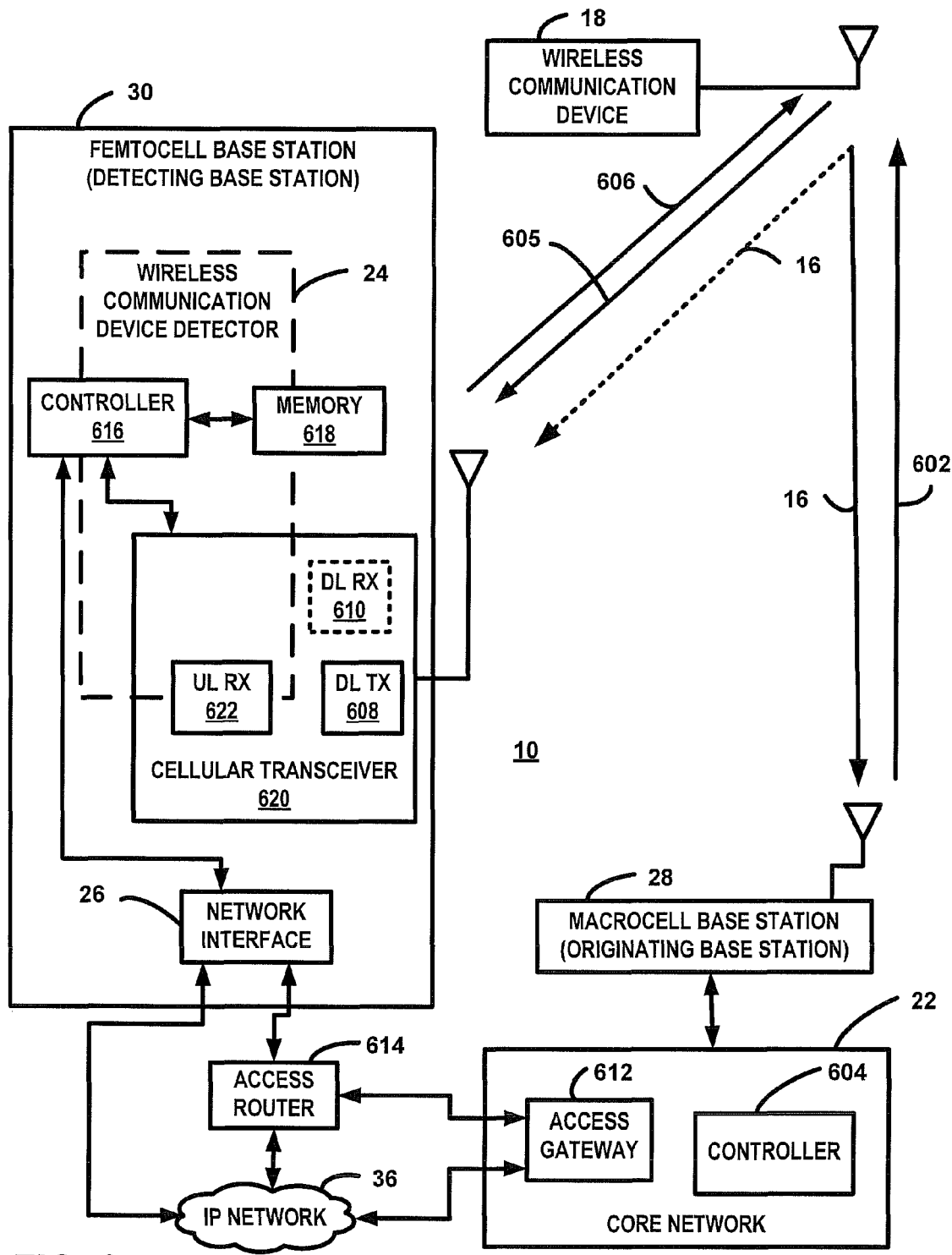
FIG. 6 is block diagram of the communication system of FIG. 1B where the wireless communication device detector includes at least a portion of an uplink cellular receiver used for communication.

FIG. 6 is block diagram of the communication system 10 of FIG. 1B where the wireless communication device detector 24 includes at least a portion of an uplink cellular receiver used for communication. For the example discussed with reference to FIG. 6, therefore, the detecting base station 14 (femtocell base station 30) provides wireless service within a femtocell 34 and the originating base station 12 (macrocell base station 20) provides service within a macrocell 32. The base stations 28, 30 operate in accordance with UMTS protocols and standards. As discussed above, the term macrocell is used primarily to distinguish this group of diverse technologies from picocells and femtocells that typically have smaller service areas on the order of 100 to 300 feet per base station. Accordingly, the macrocell base station 28 is any base station that provides wireless communication services within relatively large geographical areas as compared to the femtocell service area 34 provided by the femtocell base station 30 in the example of FIG. 6. The macrocell base station 28 provides wireless service to one or more wireless communication devices 18 by transmitting downlink signals (forward link signals) 602 to the wireless communication device 18 and receiving uplink signals 16 (reverse link signals) from the wireless communication device 18. The functional blocks of FIG. 6 may be implemented using any combination of hardware, software and/or firmware. Two or more of the functional blocks may be integrated in a single device and the functions described as performed in any single device may be implemented over several devices. For example, at least portions of the functions of the core network 22 may be performed by the base stations 28, 30, a base station controller, or an MSC in some circumstances.

The system infrastructure includes a controller 604 that may be implemented as a mobile switching center (MSC), a combination of an MSC and base station controllers (BSCs), or other similar communication controllers. The controller 604 is connected to the base stations 12, 14 through an access gateway 612 within the core network 22 and manages communications within the system 10. The network interface 26 within the detecting base station 14 facilitates communication with the IP network 36. The network interface 26, therefore, provides packet data communications and facilitates access to the Internet (or intranet) and to the access gateway 612 through the access router 614 or directly through the IP network 36. In some situations, the access router 614 may be implemented within the base station 14 or may be eliminated. In some circumstances, the connection between the access gateway 612 and the base station 14 may include a wireless communication link such as satellite communication link or point-to-point microwave link, for example. Also, in some situations, circuit switched connections may be used to connect the detecting base station 14 to the core network 22. In a typical arrangement, the detecting base station 14 (FBS 28) is connected to the Internet through an Internet Service Provider (ISP) service provided by a digital subscriber line (DSL) or CATV connection. Accordingly, the access router 614 is a DSL modem or cable modem in the typical arrangement. In the exemplary embodiment, therefore, the core network facilitates packet switched communications with at least one access gateway 612. The access gateway 612 is a communication interface that allows the base station 14 to communicate with the core network 22.

The wireless communication device 18 is any type of communication device that is capable of communicating with the base stations 12, 14. The wireless communication device 18, sometimes referred to as an access terminal (AT), may be a wireless modem, a personal digital assistant, cellular telephone, or other such device.

In addition to the functions and features discussed herein, the femtocell base station 30 operates in accordance with the communication protocols of the communication system 10. The femtocell base station 30 includes a controller 616, memory 618, cellular transceiver 620 and the network interface 608 in addition to other devices and software for performing the functions of the femtocell base station 30. The femtocell base station 30 provides wireless service to one or more wireless communication devices 18 by transmitting downlink signals (forward link signals) 605 to the wireless communication device 18 and receiving uplink signals 606 (reverse link signals) from the wireless communication device 18. The cellular transceiver 620 at least includes an uplink receiver 622 and the downlink transmitter 608. In some situations, the cellular transceiver may include a downlink receiver 610 for receiving down link signals 602 transmitted by the macrocell base station 28 to the wireless communication device 18. The downlink receiver (DL RX) 610 is illustrated with a dotted box to indicate that it may be omitted in some circumstances. Where the cellular transceiver includes the DL RX 610, the femtocell base station 30 intercepts control signals sent to the wireless communication device 18 allowing the controller 616 to retrieve additional information regarding timing, power, level identification values, or other data. In some situations, the DL RX 610 is used to monitor the macrocell base station control channels for synchronization, location determination, scheduling information, system parameters, and/or broadcast services. Further, the DL RX 610 may be used for communication between the between the macrocell base station and the femtocell. For the example, the DL RX 610 acquires the macrocell network signal and, after obtaining all the system parameters and related information, the femtocell monitors the network signal periodically. Also, interception of the downlink signals provides accurate timing information enhancing the ability of the femtocell base station to intercept the uplink signals from the wireless communication device. Although the receivers 610, 622 may be implemented as separate receivers, a suitable implementation includes utilizing common hardware and/or software in a cellular transceiver 620 to tune and receive the various signals.

For the example in FIG. 6, the wireless communication device detector 122 is implemented by at least portion of the controller 616, memory 618, and uplink receiver 622. Accordingly, the wireless communication device detector 24 is illustrated with a dashed line box to indicate that the detector 24 may include some or all various functions and devices forming the cellular transceiver 620, memory 618 and/or controller 616.

In addition to other information, the memory 618 stores communication device identification values corresponding to each communication device 108 that is authorized to receive service from the femtocell base station 30. The communication device identification value may include an electronic serial number (ESN), Mobile station Equipment Identifier (MEID) or International Mobile Subscriber Identity (IMSI) or other unique data identifying the wireless communication device 18. An example of a group of identification values stored in memory includes a collection of ESNs corresponding to the communication devices of the family members of a household where the femtocell base station 30 provides service. The identification values may be stored at the femtocell base station 30 using any of numerous techniques. An example of a suitable method of storing the values includes storing the values during an initialization procedure performed when the femtocell base station 30 is installed. The identification values may be provided, at least partially, by the core network or macro base station. In some implementations, the identification values may be omitted or the femtocell base station 30 may allow communication devices that do not have corresponding identification values stored at the femtocell base station 30 to receive service from the base station 14 (FBS 28).

As discussed below, the ESNs are used to generate long code masks such as public long code masks (PLCMs) which allow the detecting base station to receive signals from the wireless communication device 108 having the particular ESN. Other information may be received from the core network to generate the PLCMs in accordance with known techniques. In some situations, the core network, or base station may assign the PLCM to a particular wireless communication device 18

During operation, the femtocell base station 30, at least periodically monitors a wireless channel that may include the uplink communication signal 16. For the example of FIG. 6, the femtocell base station 30 monitors the uplink UMTS channel used for transmitting signals from wireless communication devices 18 to the macrocell base station 28 (originating base station 12). The cellular uplink receiver 622 is tuned to the appropriate channel or channels to detect the uplink signal 602 transmitted by the wireless communication device 108. In the exemplary embodiment, the uplink receiver 622 sufficiently demodulates and decodes uplink signals to identify the long code mask. The long code mask is typically a 42 bit binary number that is unique to the wireless communication device 18. In the exemplary embodiment, received signals are compared to a list of long code masks to determine if the signal was transmitted by an authorized wireless communication device 18. As described above, the authorized wireless communication devices are identified by device identifiers stored in memory. The identifiers either directly, or indirectly, correspond to long code masks that facilitate reception of the signals transmitted by the authorized devices in the exemplary embodiment. Typically, the PLCM is derived from a permutation of the bits of the ESN. PLCM may also be based on the Mobile station Equipment Identifier (MEID) or the International Mobile Subscriber Identity (IMSI). The femtocell base station 30 evaluates one or more characteristics of the uplink signal to determine if the wireless communication device transmitting the signal is within the service area of the base station or at least whether the device is possibly within the service area of the detecting base station femtocell base station 30. In the exemplary embodiment, the controller 616 determines if the uplink signal 602 can be successfully received. If the signal can be received, the controller 616 determines that the wireless communication device 108 is sufficiently close to receive service from the femtocell base station 30. In some cases, the uplink signal 16 may be detected and received even though the wireless communication device 18 is not within the service area of the femtocell base station 30. In these circumstances, the wireless communication device 18 may unnecessarily be instructed to search for service and will unsuccessfully attempt to acquire service from the femtocell base station 30.

In some situations, the determination of whether to send proximity message may be based on other characteristics of the identification signal in addition to the detection of the signal. For example, the proximity of the wireless communication device 18 to the detecting base station 14 (FBS 28) may be calculated or estimated based on characteristics of the uplink communication signal 16 and the device proximity message 20 is transmitted only when the estimated proximity is less than a proximity threshold. Examples of detection signal characteristics include a signal to noise ratio (SNR), bit error rate (BER), power level, and signal travel time.

The controller 616 determines, or at least estimates, the proximity of the authorized wireless communication device 18 to the femtocell base station 30 based on one or more characteristics of the uplink signal. In the exemplary embodiment, the detection of an uplink signal from the communication device 18 is sufficient to determine that the communication device 18 is within a proximity range. The proximity is used to determine whether the communication device 18 is possibly within range of the femtocell base station 30 and at least possibly able to receive communication service from the femtocell base station 30. Therefore, the controller 616 at least determines whether the communication device is possibly within range of the femtocell base station 30. If the controller determines that the wireless communication device is possibly in range, the device proximity message is transmitted to the core network through the network interface 26. For the example of FIG. 6, the device proximity message 20 is a handoff request identifying the wireless communication device 18 and the femtocell base station 30.

The controller 616 may determine whether to transmit the device proximity message 20 based on factors other than proximity of the wireless communication device 108 or the detection of the uplink communication signal 16. For example, factors may include the available capacity of the femtocell base station 30, core network requirements, required bandwidth of the wireless communication device communications, and availability of other base stations or communication service providers in the area. Accordingly, the femtocell base station 30 may not transmit the device proximity message 20 even if the wireless communication device is within range in some circumstances.

In situations where the femtocell base station 30 is communicating with one communication device and another wireless communication device is detected, the femtocell base station 30 still transmits the device proximity message 20 to the core network since the communication device may be configured not to search for a FBS unless instructed by the core network 22.

Handoffs from the femtocell base station 30 to the macrocell base station 28 can be performed in accordance with known techniques. For example, after the wireless communication device is communicating with the femtocell base station 30, the wireless communication device 18 may periodically monitor channels of the one or more macrocell base stations 28 to determine if an alternative base station is available. A determination to handoff may be based on the signal strength of the detected pilot signal transmitted from the macrocell base station.

Figure 7:
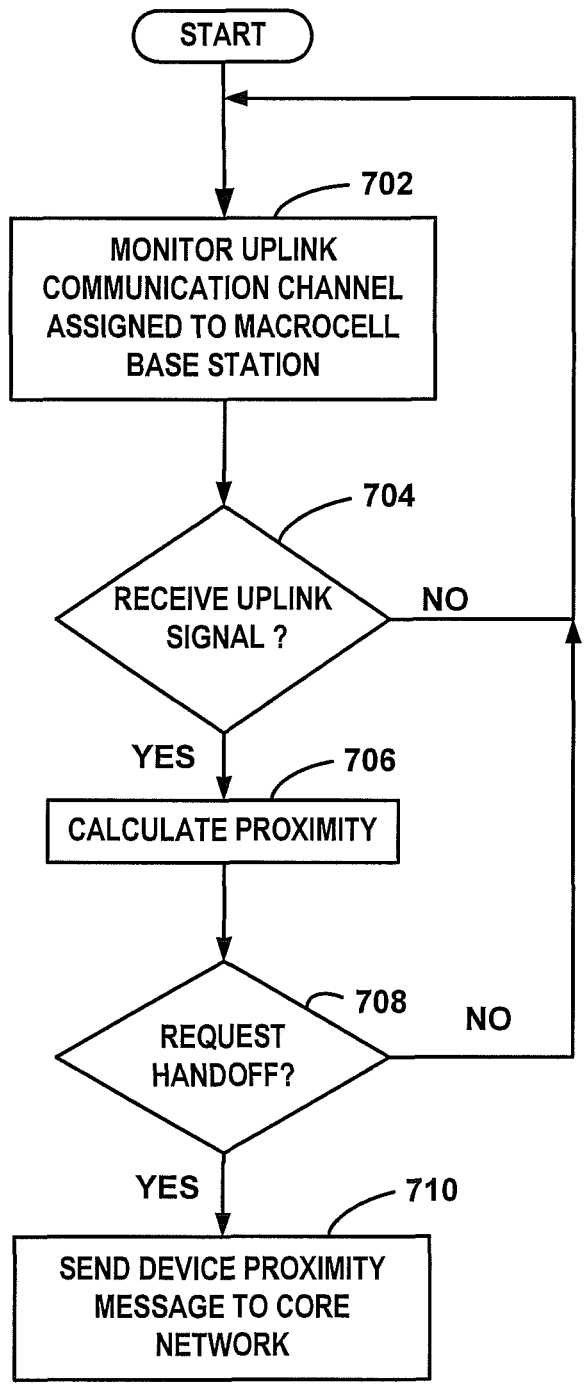
FIG. 7 is flow chart of a method of managing wireless service to a wireless communication device performed at the femtocell base station.

FIG. 7 is flow chart of a method of managing wireless service to a wireless communication device 18 performed at the femtocell base station 30. The method may be performed by any combination of hardware, software and/or firmware.

The order of the steps discussed below may be varied and one or more steps may be performed simultaneously in some circumstances. In the exemplary embodiment, the method is performed, at least in part, by executing code on the controller 616 in the femtocell base station 30.

At step 702, the uplink channel assigned to the macrocell base station is monitored. In the exemplary embodiment, the uplink receiver 622 is tuned to decode any uplink signals 602 transmitted from any of the communication devices 18 in the user list. The uplink scheduling information enables more efficient uplink monitoring. The femtocell base station 30 may detect communication devices 18 that are not in the user list but will not be able to decode the signals without identification information. In some circumstances, however, the uplink receiver 622 may be configured to monitor all uplink channels.

At step 704, it is determined whether the uplink receiver 622 has received an uplink signal. The controller 616 determines whether an uplink signal has been received from a communication device listed in the user list. If an uplink signal has been received, the method continues at step 706. Otherwise, the method returns to step 702 to continue monitoring the uplink channels.

At step 706, the proximity of the communication device 18 to the femtocell base station is calculated. The proximity calculation may be based on any number of parameters or characteristics of the received uplink signal 16 as well as other factors. Examples of suitable parameters include parameters related to signal power level and a timing offset between a transmission and reception times. Other related factors may include transmission power level, location of one or more macrocell base stations and information extracted from uplink signals and downlink signals such as time stamps, power level indicators, and power control indicators. In some circumstances, the proximity is based only on a detection of the uplink signal. The particular factors and calculation techniques depend on the type of communication system 10.

At step 708, it is determined whether the communication device 18 should attempt a handoff to the femtocell. Although the determination may be based solely on the proximity of the communication device 18 to the femtocell base station 30, other factors may be considered in some circumstances. Examples of other factors include the capacity of the femtocell base station 30, the required bandwidth required by the communication device, the current cost of the service from the macrocell base station 28 and the estimated motion of the communication device. If the controller 616 determines that a handoff should be performed, the method continues at step 710, otherwise, the method returns to step 702. In some circumstances, this step may be omitted and the femtocell base station 30 may send proximity information to the core network 22 with other information to allow the core network 22 to make the determination of whether a communication device 18 should attempt a handoff or attempt a search for the femtocell base station 30. Also, this step may be omitted and the femtocell base station 30 may send a handoff request when an uplink signal is detected.

At step 710, a device proximity message 20 is sent to the core network 22. In the exemplary embodiment, the message 20 is transmitted by the network interface 26 through either the IP network 36 or through the access router 614 to the access gateway in the core network 22. As discussed above, the device proximity message 20 at least indicates that the communication device 18 may be within range of the femtocell base station 30 although other indications and information may be included. For example, in addition to indicating the wireless communication device 18, the message may identify the femtocell base station 30. The femtocell base station 30 may transmit the message using other techniques. In some circumstances, for example, the message 20 may be transmitted through an uplink channel to the macrocell base station 28. The core network 22 may initiate searching for the specific femtocell base station, initiate searching for any femtocell base station, or may directly initiate a handoff to the femtocell base station 30.

Accordingly, the femtocell base station 30 intercepts the uplink signal transmitted from the wireless communication device to the macrocell base station 28 within an uplink channel assigned to the macrocell base station 28 for communication with wireless communication devices. The uplink channel is not assigned to femtocell base station for receiving uplink signals from wireless communication devices intended for reception by the femtocell base station. The femtocell base station 30, therefore, intercepts the uplink signals intended for the macrocell base station by eavesdropping on one or more channels assigned to one or macrocell base station 28. The channels may be established in frequency, time, with spreading codes, or other spectrum divisions and/or combinations of spectrum.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A detecting base station comprising:
   a mobile communication device detector configured to intercept an uplink communication signal transmitted from a mobile wireless communication device to an originating base station connected to a core network, the uplink communication signal transmitted from the mobile wireless communication device in accordance with control data;
   a downlink receiver configured to intercept a downlink signal transmitted from the originating base station to the mobile wireless communication device;
   a controller configured to extract the control data from the downlink signal and to calculate a proximity of the mobile wireless communication device to the detecting base station using a characteristic of the uplink communication signal and the control data extracted from the downlink signal; and
   a network interface configured to send a device proximity message to the core network, the device proximity message based on the proximity of the mobile wireless communication device to the detecting base station, and comprising a request to establish wireless service from the detecting base station to the mobile wireless communication device.

2. The detecting base station of claim 1, wherein the device proximity message indicates the proximity.

3. The detecting base station of claim 1, wherein the communication signal has a carrier frequency not assigned to the detecting base station for wireless communication service.

4. The detecting base station of claim 1, wherein the communication signal is modulated using a pseudorandom code not assigned to the detecting base station for wireless communication service.

5. The detecting base station of claim 1, wherein the detecting base station has a wireless service area smaller than an originating wireless service area of the originating base station.

6. The detecting base station of claim 5, wherein the wireless service area of the detecting base station is a femtocell and the originating wireless service area is a macrocell.

7. The detecting base station of claim 1, wherein the network interface is further configured to send the proximity message when the proximity is below a proximity threshold.

8. The detecting base station of claim 1, wherein the mobile communication device detector comprises an uplink receiver configured to receive the communication signal transmitted from the mobile wireless communication device.

9. The detecting base station of claim 8, wherein the network interface is further configured to send the device proximity message based on a received power level of the uplink communication signal.

10. The detecting base station of claim 1, the downlink receiver further configured to
    receive the downlink signal comprising the control data for the mobile wireless communication device; and
    the controller further configured to calculate the proximity based, at least partially, on the control data and a received power level of the uplink communication signal.

11. The detecting base station of claim 10, wherein the control data comprises a power level indicator, the controller configured to determine the proximity of the mobile wireless communication device to the detecting base station, at least partially on the power level indicator and the received power level of the intercepted uplink communication signal.

12. The detecting base station of claim 1, wherein the control data is transmitted by the originating base station as a medium access control (MAC) message on the downlink signal.

13. The detecting base station of claim 12, wherein the MAC message is an uplink map message transmitted in accordance with an Institute of Electrical and Electronics Engineers (IEEE) 802.16 communication standard.

* * * * *